United States Patent [19]

Abel

[11] 4,290,767

[45] Sep. 22, 1981

[54] PROCESS FOR SLOP-PADDING TEXTILE CELLULOSE MATERIAL

[75] Inventor: Heinz Abel, Reinach, Switzerland

[73] Assignee: Ciba-Geigy Corporation, Ardsley, N.Y.

[21] Appl. No.: 77,422

[22] Filed: Sep. 20, 1979

[30] Foreign Application Priority Data

Sep. 29, 1978 [CH] Switzerland .................... 10195/78

[51] Int. Cl.$^3$ .................. D06P 1/56; D06P 1/38; D06P 3/66

[52] U.S. Cl. .......................... 8/496; 8/933; 8/918; 8/901; 260/29.4 R

[58] Field of Search ............ 8/17, 18 R, 88, 54.2, 8/496

[56] References Cited

U.S. PATENT DOCUMENTS

| | | | |
|---|---|---|---|
| 3,273,954 | 9/1966 | Wachsmann et al. | 8/84 |
| 3,458,271 | 7/1969 | Ito et al. | 8/496 |
| 3,468,618 | 9/1969 | Buehler et al. | 8/495 |
| 3,529,922 | 9/1970 | Berger et al. | 8/84 |
| 3,957,433 | 5/1976 | Greenshields et al. | 8/172 R |
| 3,983,588 | 10/1976 | Buhler et al. | 8/18 |
| 4,009,000 | 2/1977 | Buhler | 8/495 |
| 4,076,497 | 2/1978 | Freyberg et al. | 8/93 |
| 4,132,523 | 1/1979 | Ong | 8/21 R |

FOREIGN PATENT DOCUMENTS

| | | | |
|---|---|---|---|
| 696369 | 10/1964 | Canada | 8/18 |
| 556439 | 7/1974 | Switzerland . | |
| 953253 | 2/1961 | United Kingdom . | |
| 957231 | 2/1961 | United Kingdom . | |
| 1368712 | 10/1974 | United Kingdom . | |

*Primary Examiner*—Joseph L. Schofer
*Assistant Examiner*—Maria Parrish Tungol
*Attorney, Agent, or Firm*—Edward McC. Roberts

[57] ABSTRACT

A process for slop-padding textile cellulose material with anionic substantive dyes, which consists in applying to said material an aqueous dye liquor which, in addition to the dye, contains (a) a quaternization product of a polyalkylene oxide adduct of 2 to 100 moles of alkylene oxide and optionally 1 mole of styrene oxide with 1 mole of a fatty amine containing at least 8 carbon atoms, (b) an etherified N-methylolmelamine, and (c) an acid catalyst, if desired drying the impregnated cellulose material and then subjecting it to a heat treatment.

27 Claims, No Drawings

PROCESS FOR SLOP-PADDING TEXTILE CELLULOSE MATERIAL

The present invention relates to a novel continuous process for dyeing textile cellulose material with anionic substantive dyes and to the cellulose material dyed by this process.

The process of the invention consists in applying to the cellulose material an aqueous dye liquor which, in addition to the dye, contains (a) a quaternisation product of a polyalkylene oxide adduct of 2 to 100 moles of alkylene oxide and optionally 1 mole of styrene oxide with 1 mole of a fatty amine containing at least 8 carbon atoms,
(b) an etherified N-methylolmelamine, and
(c) an acid catalyst, if desired drying the dyed material and then subjecting it to a heat treatment.

Component (a) is advantageously a quaternisation product of a fatty amine-alkylene oxide adduct of the formula

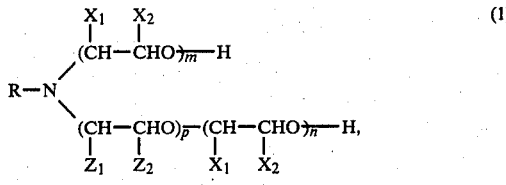

wherein R is an aliphatic hydrocarbon radical containing 8 to 22 carbon atoms, one of $X_1$ and $X_2$ is hydrogen or methyl and the other is hydrogen, one of $Z_1$ and $Z_2$ is hydrogen and the other is phenyl, p is 0 or 1 and m and n are integers, the sum of which is 2 to 100.

In formula (1), R is preferably an alkyl or alkenyl radical of 12 to 22, in particular 12 to 18, carbon atoms, and $X_1$ and $X_2$ are preferably hydrogen. The sum of $m+n$ is preferably 2 to 40, most preferably 15 to 30.

An alkyl radical R is e.g. octyl, decyl, dodecyl, myristyl, hexadecyl, heptadecyl, octadecyl, arachidyl or behenyl. An alkenyl radical R is e.g. dodecenyl, hexadecenyl, oleyl or octadecenyl. Preferably, R is dodecyl, octadecyl or octadecenyl.

The polyadducts of formula (1) is obtained by the addition of 2 to 100 moles of alkylene oxide, preferably ethylene oxide, or alternately, in any order, ethylene oxide and propylene oxide, and optionally 1 mole of styrene oxide, or mixtures thereof, to aliphatic amines which contain an aliphatic hydrocarbon radical of at least 8, preferably 8 to 22, carbon atoms. The addition of alkylene oxide is carried out by known methods.

The aliphatic amines required as starting materials for obtaining the adducts of formula (1) can have saturated or unsaturated, branched or unbranched hydrocarbon radicals. The amines can be chemically homogeneous or in the form of mixtures. Mixtures of amines are preferably those which are formed during the conversion of natural fats or oils, e.g. tallow fats, soybean or coconut oil, into the corresponding amines. Specific examples of amines are octylamine, dodecylamine, hexadecylamine, heptadecylamine, octadecylamine, tallow fatty amine, behenylamine and octadecenylamine (oleylamine).

Adducts with the amines can be formed with ethylene oxide or, to introduce the methyl or phenyl group into the ethyleneoxy groups, also with propylene oxide and/or styrene oxide. Propylene oxide is preferably used in admixture with ethylene oxide. It is advantageous to use, per mole of amine, 5 to 15 moles of propylene oxide and at least 15 moles, preferably 20 to 35 moles, of ethylene oxide. The addition of styrene oxide is advantageously effected before the addition of ethylene oxide. It is preferred to use, per mole of amine, 1 mole of styrene oxide and 15 to 30 moles of ethylene oxide.

The above described fatty amine adducts are employed in the process of the invention in the form of their N-quaternised products. The quaternisation is carried out by methods which are known per se using conventional alkylating or aralkylating agents. Suitable quaternising agents are e.g. the esters of strong mineral acids or organic sulfonic acids with lower ($C_1$-$C_5$) aliphatic or araliphatic alcohols, e.g. $C_1$-$C_4$ alkyl halides such as methyl iodide, methyl chloride, ethyl bromide or ethyl chloride; aralkyl halides, such as benzyl chloride; di-($C_1$-$C_4$alkyl) sulfates, such as dimethyl sulfate or diethyl sulfate; halocarboxamides, such as chloroacetamide; halohydrins, such as ethylene chlorohydrin; epihalohydrins, such as epibromohydrin or epichlorohydrin; haloalkyl nitriles, such as chloroacetonitrile and esters of sulfonic acids of the benzene series, for example the $C_1$-$C_4$alkyl esters, such as the methyl, ethyl or propyl esters of benzenesulfonic acid, p-methylbenzenesulfonic acid or p-chlorobenzenesulfonic acid.

Preferred quaternising agents, however, are diethyl sulfate, chloroacetamide, ethylene chlorohydrin, epichlorohydrin, benzyl chloride and, in particular, methyl chloride and dimethyl sulfate.

Particularly suitable components (a) have been found to be quaternisation products of the formula

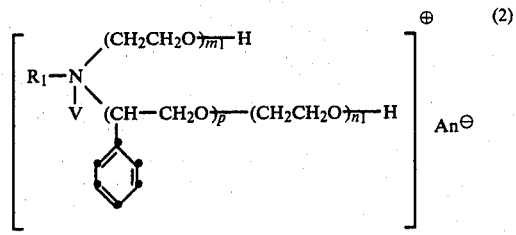

wherein $R_1$ is alkyl or alkenyl, each of 12 to 22, preferably 12 to 18, carbon atoms, V is $C_1$-$C_4$alkyl, hydroxy-$C_2$-$C_4$alkyl, carbamoylmethyl or benzyl, p is 0 or 1 and An$^\ominus$ is the anion of an organic or inorganic acid, in particular of a strong mineral acid or of an organic sulfonic acid, for example the chloride, bromide, sulfate, benzenesulfonate, p-toluenesulfonate, methanesulfonate or ethanesulfonate ion, and the sum of $m_1+n_1$ is 15 to 30.

Depending on their solids content, the quaternised fatty amine adducts are added, as component (a), to the dyebaths preferably in amounts between 2.5 and 25 g/l.

Both completely as well as only partially etherified N-methylolmelamines are suitable for use as component (b). The N-methylolmelamines are preferably esterified with methanol or ethanol. Examples of suitable etherified N-methylolmelamines are trimethylolmelamine-trimethyl or -triethyl ether, pentamethylolmelamine-di-bis-trimethyl ether, hexamethylolmelamine-tetramethyl ether, hexamethylolmelamine-pentamethyl ether and, in particular, hexamethylolmelamine-hexamethyl or -hexaethyl ether. The etherified N-methylolmelamines to be used in the present invention are known compounds and can be obtained by known methods.

Component (b) is preferably added to the padding liquor in an amount varying between 2.5 and 15 g/l.

As component (c), the aqueous padding liquor contains an acid catalyst. Particularly suitable acid catalysts are salts of weak bases and mineral acids, for example zinc chloride, zinc nitrate, magnesium nitrate, magnesium chloride, or mineral acid salts of organic amines, such as mono-, di- or triethanolamine hydrochloride, and also weak acids, for example organic acids, such as oxalic acid. Preferred catalysts are ammonium salts of organic salts or lower ($C_1$–$C_5$) carboxylic acids, for example ammonium chloride, ammonium bromide, ammonium sulfate, ammonium acetate, ammonium dihydrogen sulfate, diammonium sulfate, diammonium phosphate or ammonium salts of succinic acid, maleic acid, adipic acid, sulfamic acid, or also of ethylenediaminetetraacetic acid and, in particular, hydroxylamine sulfate.

The acid catalyst is added to the padding liquor preferably in an amount between 0.5 and 10 g/l, most preferably between 1 and 5 g/l.

In addition to components (a), (b) and (c), the padding liquor can also contain, as component (d), a nonionic alkylene oxide adduct of 20 to 100 moles of alkylene oxide, e.g. ethylene oxide and/or propylene oxide, with 1 mole of an aliphatic monoalcohol containing at least 8 carbon atoms, of a phenol which is unsubstituted or substituted by alkyl or phenyl, or of a fatty acid containing 8 to 22 carbon atoms.

The aliphatic monoalcohols employed for obtaining component (d) are e.g. water-insoluble monoalcohols containing preferably 8 to 22 carbon atoms. These alcohols can be saturated or unsaturated and branched or straight chain, and they can be employed by themselves or in mixtures with one another. It is possible to react natural alcohols, e.g. myristyl alcohol, cetyl alcohol, stearyl alcohol or oleyl alcohol, or synthetic alcohols, preferably 2-ethylhexanol, or also trimethylhexanol, trimethylnonyl alcohol, hexadecyl alcohol or the alfols, with the alkylene oxide. The alfols are linear primary alcohols. The number behind the name indicates the average number of carbon atoms which the alcohol contains. Some representatives of these alfols are: alfol (8–10), (10–14), (12), (16), (18), (20–22).

Examples of unsubstituted or substituted phenols are: phenol, o-phenylphenol or alkylphenols containing 1 to 16, preferably 4 to 12 carbon atoms in the alkyl moiety. Examples of these alkylphenols are: p-cresol, butylphenol, tributylphenol, octylphenol and, in particular, nonylphenol.

The fatty acids preferably contain 8 to 22 carbon atoms and can be saturated or unsaturated. Examples of these fatty acids are: capric, lauric, myristic, palmitic or stearic acid, and decenoic, dodecenoic, tetradecenoic, hexadecenoic, oleic, linolic, linolenic or ricinoleic acid.

Preferred alkylene oxide reaction products which are employed as component (d) can be illustrated by the formula

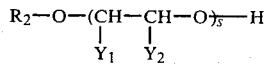  (3)

wherein $R_2$ is alkyl or alkenyl, each of 8 to 18 carbon atoms, o-phenylphenyl or alkylphenyl containing 4 to 12 carbon atoms in the alkyl moiety, one of $Y_1$ and $Y_2$ is hydrogen or methyl and the other is hydrogen and s is an integer from 20 to 100.

Component (d) is advantageously added to the padding liquor in an amount from 2 to 20 g/l, preferably from 3 to 10 g/l.

Components (e), (b) and optionally (d) can also be added to the padding liquor in the form of an anhydrous or aqueous preparation, in which connection the weight ratio of component (a) to component (b) is advantageously between 5:1 and 1:5, preferably between 2:1 and 1:2, and to component (d) advantageously between 4:1 and 1:2, preferably between 2:1 and 1:1. The preparations can be obtained by simply stirring the components (a), (b) and (d). By adding water and optionally a base, e.g. an alkali metal hydroxide, such as sodium or potassium hydroxide, or a lower alkanolamine, such as monoethanolamine, diethanolamine or, in particular, triethanolamine, they are obtained in the form of homogeneous, preferably clear, mixtures, which have a very good shelf life at room temperature.

The novel preparations can also be obtained without water. The preparations advantageously contain, in each case based on the weight of the preparation, 10 to 50% by weight of component (a)
10 to 50% by weight of component (b)
0 to 5% by weight of a base
0 to 80% by weight of water
0 to 10% by weight of component (d).

Suitable substantive dyes are the conventional anionic direct dyes, for example the "Direct Dyes" listed on pages 2005–2478 in the Colour Index, 3rd Edition (1971), Vol. 2. The amount of dye depends as a rule on the desired colour strength and is advantageously 1 to 100 g/l, preferably 20 to 100 g/l and, most preferably, 20 to 50 g/l.

The padding liquor can additionally contain further ingredients, for example wetting agents, antifoams, and thickeners, e.g. alginates, polyacrylates, starch ethers, flour derivatives, and salts, e.g. sodium chloride. The pH value of the liquor is ordinarily from 5 to 8.

Suitable cellulose material is that made of natural or regenerated cellulose, for example hemp, jute, viscose rayon, viscose staple fibre, and, in particular, cotton, and also fibre blends, for example polyester/cotton blends, the polyester component of which is dyed with disperse dyes beforehand, simultaneously or subsequently. The cellulose fibrous material can be in the most diverse states of processing, for example as loose material, yarn, wovens or knits.

The aqueous liquors can be applied in known manner to the fibrous material, advantageously by impregnating the material on a padder. The liquor-pick is about 50 to 100% by weight. Suitable padding methods are the pad-thermofix process or the pad-steam process.

The padding can be effected at 20° to 60° C., but preferably at room temperature. After it has been padded and squeezed out, the cellulose material, if desired after an intermediate drying, is subjected to a heat treatment e.g. in the temperature range from 100° to 210° C. Preferably, the heat treatment is preferably carried out by thermofixation at a temperature from 120° to 210° C., preferably 140° to 180° C., after an intermediate drying at 80° to 120° C. The heat treatment can also be carried out direct, i.e. without an intermediate drying, by steaming at 100° to 120° C. Depending on the nature of the heat development and the temperature range, the heat treatment can take from 30 seconds to 10 minutes. If desired, the padded and squeezed cellulose material can also be rolled up before being dried and subjected to the heat treatment, packed in a plastic sheet and stored for 4 to 24 hours at room temperature.

Immediately after the heat treatment, the dyed cellulose material can be given a washing-off in conventional manner in order to remove non-fixed dye or melamine out addition of the quaternisation product of formula (11) and hexamethylolmelamine-hexamethyl ether, the dyeing is 55% lighter in shade.

Strong, level dyeings are also obtained by substituting for the dye of formula (101) the same amount of a dye of the formula

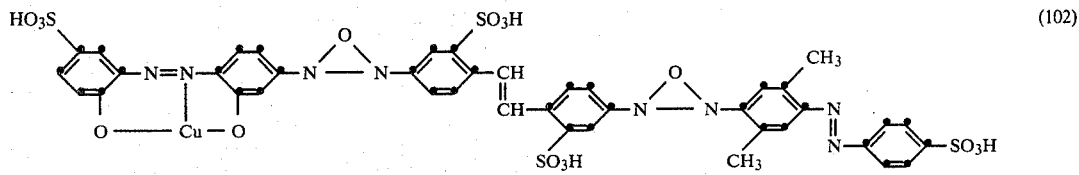

(102)

derivative. To this end, the substrate is treated e.g. at 40° to 80° C. in a solution which contains soap or synthetic detergent. In most cases it is not necessary to give the dyed goods an afterwash.

Level dyeings of good wet- and lightfastness properties are obtained by the process of the present invention. In particular, owing to the synergistic action of components (a) and (b) it is possible to obtain an increase in the dye yield, without the addition of urea, in the continuous dyeing process, especially in a pad-thermofix process. The increase is from 100 to 400% by weight.

The invention is illustrated in more detail by the following Examples, in which the percentages are by weight, unless otherwise stated. The amounts of dye refer to commercially available, i.e. diluted, goods, and the amounts of components (a) to (d) refer to pure substance. The five-figure Colour Index (C.I.) refer to the 3rd Edition of the Colour Index.

EXAMPLE 1

Cotton corduroy is padded with a dye liquor which contains 20 g of a dye of the formula or the same amount of a direct dye (Direct Blue 106 C.I. 51300). However, if dyeing is carried out without preparation (a), then the resultant dyeings are, respectively, 41% and 78% weaker.

Strong and level dyeings are also obtained by using, instead of preparation (a), the same amount of the following preparations (b) and (c).

(b) Preparation consisting of 20% of a quaternisation product of the formula

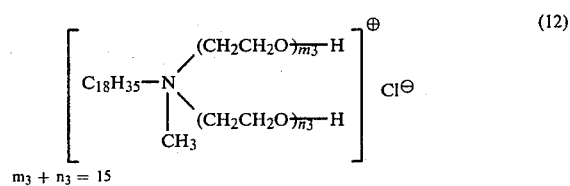

(12)

$m_3 + n_3 = 15$

25% of hexamethylolmelamine-hexamethyl ether and 55% of water;

(c) Preparation consisting of 30% of a quaternisation product of the formula

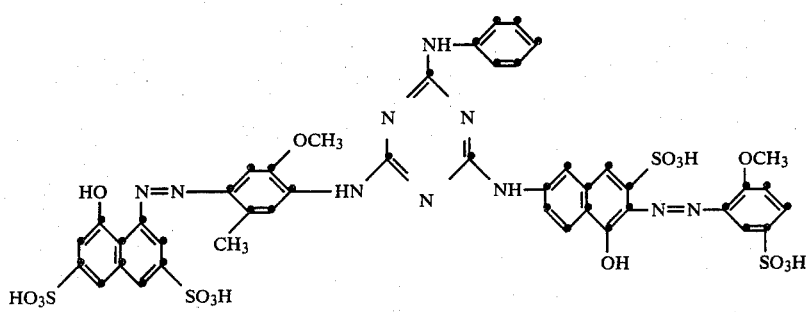

(101)

60 g of a preparation (a) consisting of 25% of a quaternisation product of the formula

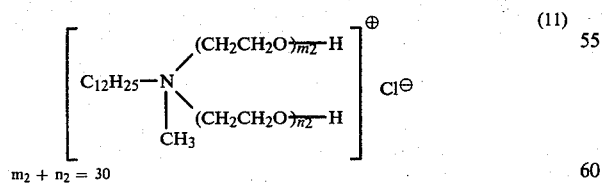

(11)

$m_2 + n_2 = 30$

25% of hexamethylolmelamine-hexamethyl ether and 50% of water, 2 g of hydroxylamine sulfate and 918 g of water, and squeezed out to a pick-up of 85%. The cotton fabric is then dried at 80° C. and subjected to a thermosol treatment for 4 minutes at 160° C. After rinsing the cotton in cold water, a level dark red dyeing is obtained. If the same procedure is carried out, but with-

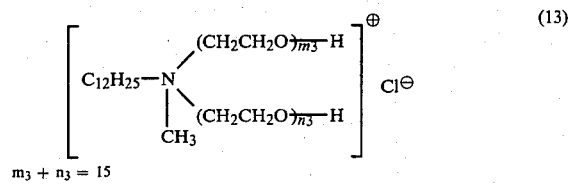

(13)

$m_3 + n_3 = 15$

20% of hexamethylolmelamine-hexamethyl ether and 50% of water.

EXAMPLE 2

A viscose/staple fibre fabric is padded with a dye liquor which contains 25 g of a copper phthalocyanine dye of the formula

20 g of a preparation (d) consisting of 50% of a quaternisation product of the formula

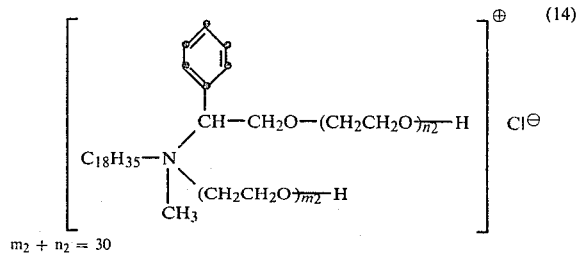

$m_2 + n_2 = 30$

50% of hexamethylolmelamine-hexamethyl ether, 2 g of ammonium acetate, 1.5 g of locust bean gum and 951.5 g of water, and squeezed out to a pick-up of 75%. The fabric is then treated for 4 minutes at 160° C. After excess dye has been washed off in cold water, the fabric is given an aftertreatment for 15 minutes at room temperature with an aqueous solution which contains, based on the fabric, 2% of a condensation product of ethylenediamine dihydrochloride, formaldehyde and boric acid. After the fabric has been dried, an intense turquoise blue dyeing is obtained.

If the same procedure is repeated, but without addition of the preparation (d), the dyeing is 70% lighter in shade.

EXAMPLE 3

Viscose/rayon lining is padded with a dye liquor which contains 30 g of a dye of the formula

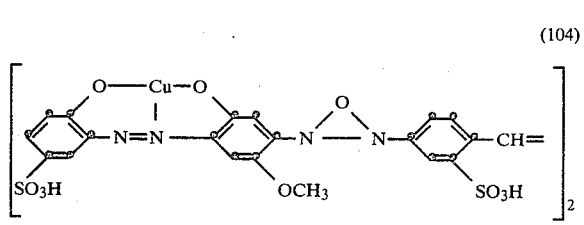

50 g of a preparation (e) consisting of 18% of a quaternisation product of the formula

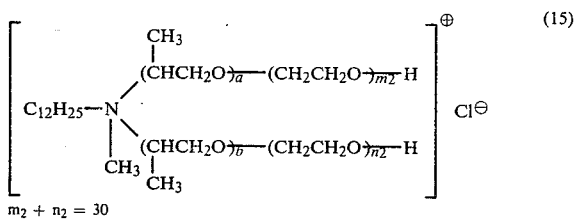

$m_2 + n_2 = 30$
$a + b = 6$

18% of hexamethylolmelamine-hexamethyl ether, 2% of triethanolamine and 62% of water, 3 g of the ammonium salt of maleic acid and 917 g of water. The fabric is squeezed out to a pick-up of 83%.

After it has been padded, the fabric is rolled up, packed in a polyethylene sheet and stored for 18 hours at room temperature while being slowly rotated continuously. The fabric is then dried on a tenter frame at 90° C. The fabric is then rinsed with cold water and given an aftertreatment with an aqueous solution which contains, based on the weight of the fabric, 3% of a dicyandiamide-urea-formaldehyde condensation product. A fast, dark grey dyeing is obtained. If the same procedure is repeated, but without addition of the preparation (e), the resultant dyeing is 60% lighter in shade.

A strong, level grey dyeing is also obtained by using, instead of the quaternisation product of the formula (15), the same amount of the quaternisation product of the formula

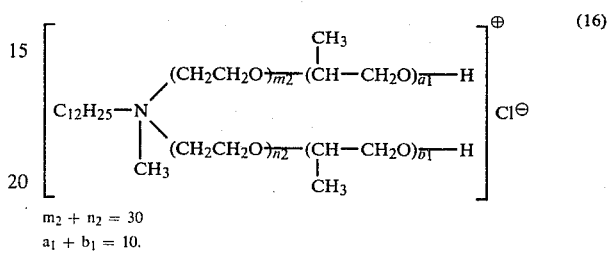

$m_2 + n_2 = 30$
$a_1 + b_1 = 10.$

EXAMPLE 4

A polyester/cotton blend (66% polyester, 34% cotton) is padded with a dye liquor which contains 20 g of a dye of the formula (101), 30 g of a dye of the formula

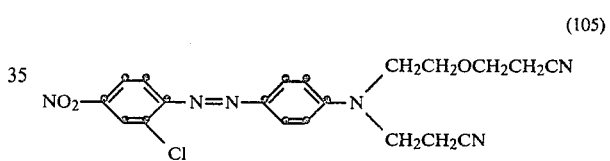

5 g of a silicone-containing anionic surfactant, e.g. a sulfated nonylphenol-polyglycol ether, 20 g of a polyacrylate thickener, 2 g of ammonium acetate, 60 g of a preparation (f) consisting of 20% of an adduct of 2 moles of ethylene oxide with 1 mole of laurylamine which has been quaternised with dimethyl sulfate, 20% of hexamethylolmelamine-hexamethyl ether, 7% of an adduct of 80 moles of ethylene oxide with 1 mole of oleyl alcohol and 53% of water, and 863 g of water. The fabric is squeezed out to a pick-up of 90%.

The padded goods are then dried at 95° C. and subjected to a thermosol treatment for 40 seconds at 200° C. The fabric is then rinsed cold and given an aftertreatment with an aqueous solution of the condensation product of dicyandiamide, formaldehyde and urea. A level, red dyeing is obtained and both fibre components have the same shade.

EXAMPLE 5

Cotton fabric is padded with a dye liquor which contains 20 g of a direct dye (Direct Red 23 C.I. 29160),
50 g of a preparation (g) consisting of
15% of a quaternisation product of the formula

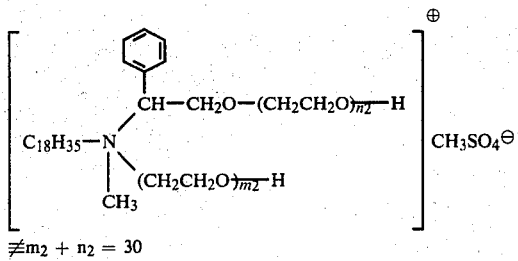

$\neq m_2 + n_2 = 30$

30% of hexamethylolmelamine-hexamethyl ether and 55% of water, 2 g of ammonium acetate and 923 g of water. The cotton is squeezed out to a pick-up of 70%. After it has been padded, the fabric is dried and subjected to a dry heat treatment for 90 seconds at 170° C. Instead of being dried and thermofixed, the cotton fabric can also be steamed for 10 minutes at 120° C. with saturated steam. After the heat treatment, the goods are rinsed in cold water. An intense, level red dyeing is obtained.

By repeating the above procedure, but without addition of preparation (g), a dyeing which is 80% lighter in shade is obtained.

What is claimed is:

1. A process for slop-padding textile cellulose material with anionic substantive dyes, which comprises applying to said material an aqueous dye liquor which, in addition to the dye, contains
   (a) a quaternisation product of a poly adduct
   ($a_1$) of 2 to 100 moles of alkylene oxide with 1 mole of a fatty amine containing at least 8 carbon atoms, or
   ($a_2$) of 2 to 100 moles of alkylene oxide and 1 mole of styrene oxide with 1 mole of a fatty amine containing at least 8 carbon atoms,
   (b) 2.5 to 15 g/l an etherified N-methylolmelamine, and
   (c) an acid catalyst,
and then subjecting the textile material to a heat treatment.

2. A process according to claim 1, wherein the aqueous dye liquor contains 20 to 100 g/l of anionic substantive dye.

3. A process according to claim 1, wherein component (a) is a quaternisation product of a fatty amine-alkylene oxide adduct of the formula

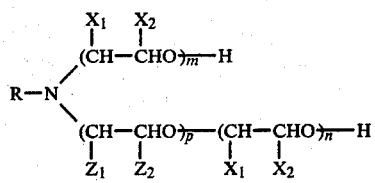

wherein R is an aliphatic hydrocarbon radical containing 8 to 22 carbon atoms, one of $X_1$ and $X_2$ is hydrogen or methyl and the other is hydrogen, one of $Z_1$ and $Z_2$ is hydrogen and the other is phenyl, p is 0 or 1, and m and n are integers, the sum of which is 2 to 100.

4. A process according to claim 3, wherein R is an alkyl or alkenyl radical, each of 12 to 22 carbon atoms.

5. A process according to claim 3, wherein $X_1$ and $X_2$ are hydrogen.

6. A process according to claim 3, wherein the sum of n+m is 2 to 40.

7. A process according to claim 3, wherein p is 1 and the sum of n+m is 15 to 30.

8. A process according to claim 1, wherein component (a) is a fatty amine-alkylene oxide adduct ($a_1$) or ($a_2$) which is quaternised with an ester of a strong mineral acid or organic sulfonic acid with a lower aliphatic alcohol or araliphatic alcohol.

9. A process according to claim 8, wherein the quaternising agent is a $C_1$-$C_4$alkyl halide, aralkyl halide, di-($C_1$-$C_4$-alkyl)sulfate, halocarboxamide, halohydrin, epihalohydrin, haloalkylnitrile or a benzenesulfonic acid ester.

10. A process according to claim 8, wherein the quaternising agent is methyl chloride, dimethyl sulfate, diethyl sulfate, chloroacetamide, ethylene chlorohydrin, epichlorohydrin or benzyl chloride.

11. A process according to claim 1, wherein component (a) is a quaternisation product of the formula

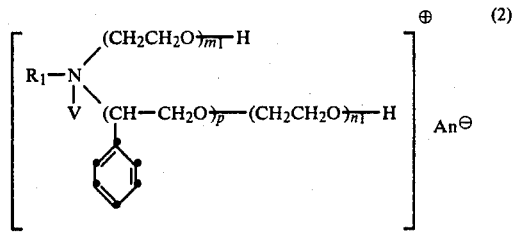

wherein $R_1$ is alkyl or alkenyl, each of 12 to 22 carbon atoms, V is $C_1$-$C_4$alkyl, hydroxy-$C_2$-$C_4$alkyl, carbamoylmethyl or benzyl, p is 0 or 1 and $An^\ominus$ is the anion of an organic or inorganic acid, and the sum of $m_1+n_1$ is 15 to 30.

12. A process according to claim 1, wherein the aqueous dye liquor contains 2.5 to 25 g/l of component (a).

13. A process according to claim 1, wherein the aqueous dye liquor contains, as component (b), a N-methylolmelamine etherified with methanol or ethanol.

14. A process according to claim 13, wherein component (b) is hexamethylolmelamine-hexamethyl or -hexaethyl ether.

15. A process according to claim 1, wherein component (c) is an ammonium salt of an inorganic acid or $C_1$-$C_5$-carboxylic acid.

16. A process according to claim 1, wherein the aqueous dye liquor additionally contains, as component (d), a nonionic alkylene oxide adduct of 20 to 100 moles of alkylene oxide with 1 mole of an aliphatic monoalcohol containing at least 8 carbon atoms, of a phenol which is unsubstituted or substituted by alkyl or phenyl, or of a fatty acid containing 8 to 22 carbon atoms.

17. A process according to claim 16, wherein component (d) is a compound of the formula

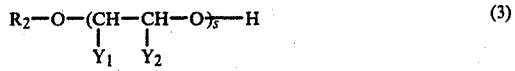

wherein $R_2$ is alkyl or alkenyl, each of 8 to 18 carbon atoms, o-phenylphenyl or alkylphenyl containing 4 to 12 carbon atoms in the alkyl moiety, one of $Y_1$ and $Y_2$ is hydrogen or methyl and the other is hydrogen and s is an integer from 20 to 100.

18. A process according to claim 1, wherein the aqueous dye liquor contains 3 to 20 g/l of component (d).

19. A process according to claim 1 which comprises the use of a preparation which contains components (a) and (b) or components (a), (b) and (d).

20. A process according to claim 19, wherein the preparation contains water and components (a) and (b) or water and components (a), (b) and (d) or water, components (a) and (b) and a base, or water, components (a), (b) and (d) and a base.

21. A process according to claim 20, wherein the aqueous preparation contains 10 to 50% by weight of component (a), 10 to 50% by weight of component (b), 0 to 5% by weight of a base, 0 to 80% by weight of water and 0 to 10% by weight of component (d), the amounts being based respectively on the entire preparation.

22. A process according to claim 1, wherein dyeing is carried out by a pad-thermofix process.

23. A process according to claim 22, wherein the thermofixation is carried out at a temperature of 120° C. to 210° C.

24. A process according to claim 1, which comprises
(1) applying to said material an aqueous dye liquor which, in addition to the dye, contains
(a) a quaternisation product of a poly adduct
($a_1$) of 2 to 100 moles of alkylene oxide with 1 mole of a fatty amine containing at least 8 carbon atoms or
($a_2$) of 2 to 100 moles of alkylene oxide and 1 mole of styrene oxide with 1 mole of a fatty amine containing at least 8 carbon atoms,
(b) an etherified N-methylolmelamine, and
(c) an acid catalyst,
(2) drying the cellulose material and then (3) subjecting the material to a thermofixation.

25. A process according to claim 24, wherein the intermediate drying (2) of the cellulose material is carried out at a temperature of 80° to 120° C.

26. An aqueous dyebath for slop-padding textile cellulose material which comprises at least one anionic substantive dye, a preparation containing (a) a quaternisation product of a poly adduct ($a_1$) of 2 to 100 moles of alkylene oxide with 1 mole of a fatty amine containing at least 8 carbon atoms or ($a_2$) of 2 to 100 moles of alkylene oxide and 1 mole of styrene oxide with 1 mole of a fatty amine containing at least 8 carbon atoms, and (b) an etherified N-methylolmelamine, and an acid catalyst.

27. A dyebath according to claim 26, wherein the preparation additionally contains, as component (d), a nonionic alkylene oxide adduct of 20 to 100 moles of alkylene oxide with 1 mole of an aliphatic monoalcohol containing at least 8 carbon atoms, of a phenol which is unsubstituted or substituted by alkyl or phenyl, or of a fatty acid containing 8 to 22 carbon atoms.

* * * * *